United States Patent
Ramanathan et al.

(10) Patent No.: US 6,239,213 B1
(45) Date of Patent: May 29, 2001

(54) PROCESS FOR THE PREPARATION OF STABLE AQUEOUS URETHANE DISPERSIONS

(75) Inventors: Lalgudi Srinivasan Ramanathan; Kundalik Ganpat Raut; Subagiri Ramaswamyiyengar Srinivasan; Swaminathan Sivaram, all of Maharashtra (IN)

(73) Assignee: Council of Scientific & Industrial Research, New Delhi (IN)

( * ) Notice: Subject to any disclaimer, the term of this patent is extended or adjusted under 35 U.S.C. 154(b) by 0 days.

(21) Appl. No.: 09/143,011

(22) Filed: Aug. 28, 1998

(30) Foreign Application Priority Data

Jun. 12, 1998 (IN) .......................................... 1633/DEL/98

(51) Int. Cl.$^7$ ................................ C08J 3/00; C08K 3/20; C08L 75/00
(52) U.S. Cl. .......................... 524/591; 524/839; 524/840
(58) Field of Search .................................. 524/591, 839, 524/840

(56) References Cited

U.S. PATENT DOCUMENTS 5,389,718 * 2/1995 Potter et al. .......................... 524/591

* cited by examiner

Primary Examiner—Patrick D. Niland
(74) Attorney, Agent, or Firm—Ladas & Parry

(57) ABSTRACT

This invention relates to the process for the preparation of aqueous polyurethane dispersions, which comprises preparing an isocynate terminated carboxyl group containing prepolymer, by preparing a solution of a polyol in an organic solvent, adding an ionic group containing compound to this solution, heating this mixture at a controlled temperature, adding an isocyanate in the reaction mixtute optionally in the presence of a catalyst depending upon the isocynate, stirring, neutralizing and cooling the mixture at ambient temperatures and finally dispersing the mixture in water to obtain the product.

20 Claims, No Drawings

PROCESS FOR THE PREPARATION OF STABLE AQUEOUS URETHANE DISPERSIONS

FIELD OF INVENTION

This invention relates to a process for the preparation of stable aqueous polyurethane dispersions. More particularly it relates to a process for the preparation of aqueous polyurethane dispersions by reacting a polyester polyol, preferably, branched and more preferably, a polyester polyol containing a long chain triol, having an average molecular weight of about 300–3000 and containing i. an ionizable group of about 2–100 milliequivalents per 100 gram of prepolymer;

ii. optionally a polyether polyol, preferably poly (propyleneglycol) of molecular weight 500–5000, and iii. aliphatic or aromatic isocyanate having functionality $\geq 2$.

The isocyanate terminated and carboxyl group containing prepolymer prepared as described above, upon neutralisation with amines, preferably, tertiary amines, gives stable aqueous dispersions of polyurethanes.

BACKGROUND OF THE INVENTION

Polyurethanes are used for a wide range of commercial applications such as adhesives, coatings on different substrates including textiles, plastics, wood, glass fibers, metals and the like due to their extremely good chemical and abrasion resistance, touglness, flexibility and durability. Conventionally, these polyurethane coating products are diluted with organic solvents to get desirable consistency before application. As the coating dries, these organic solvent vapors escape into the atmosphere. This is both economically and environmentally disadvantageous on account of the higher cost of organic solvents, and the pollution and health hazards caused by such fugitive emissions. More importantly, these organic vapors pollute the atmosphere and create serious health hazards.

Many approaches are reported in prior art to form polyurethane coatings from the dispersion of these polymers in water. The use of water is economically advantageous as well as it does not pollute the atmosphere. However, polyurethane polymers are not compatible with water i.e they do not form stable dispersions in water until special process and/or special monomer(s) are used in their preparation.

One such approach in the prior art is the use of external emulsifiers to disperse and stabilise the polymers in water (U.S. Pat. No. 2,968,575). Though these emulsifiers stabilise the polymer in water, they posses the disadvantage that such coatings are themselves sensitive to water, and hence give poor coating performance in terms of hydrolytic stability. To overcome the above draw back, ionic groups are incorporated into the polyurethane backbone during polymerisation Upon neuralising these ionic groups the respective salts formed act as an internal emulsifier. One such approach (Neth. Pat. Appln. 6,410,928) discloses the use of cationic ionomers for preparing polyurethane latexes. In another approach (Ger. Offen. 2,744,544) polyurethane production was disclosed using anionic ionomers. The incorporation of nonionic emulsifiers in the polyurethane back bone is disclosed in U.S. Pat. No. 4,190,566. Further improvements in properties of coating derived from polyurethane dispersion are obtained by combining both ionic and non-ionic group in the polymer back bone. This has been disclosed in U.S. Pat. No. 4,238,378.

These prior art patents are related to the production of linear polyurethane dispersions. Coatings derived from these linear polyurethane dispersions possess limited water resistance and do not have good solvent resistance.

Ger Pat. 4,237,965 discloses the production of aqueous polyurethane binders from dimer diol and trimethylol propane as isocyanate reactive group for stoving lacquers. Herein, branching in the diol is expected to increase water resistance along with other important properties. Nevertheless, the externally added short chain triol increases the prepolymer viscosity, resulting in the reduction of the solid content of the dispersion to about 25%. Jap.Pat. 06,329,744 and Jap.Pat. 06,93,068 disclose the production of water dispersible polyurethane resin using trimethylol propane along with other isocyanate reactive components. The externally added short chain triol contributes more to the hard segment of the polymer. Further, crosslinking with aminoplast resins results in coatings with diminished flexibility and more prone to cracking.

Polyurethane dispersions disclosed in the prior art are normally derived from linear diols as one of the isocyanate reactive component and some quantity of short chain triols to impart a certain degree of branching/crosslinking. The main disadvantage of using short chain triols externally are a) undesirable increase in viscosity during prepolymer production b) insufficient branching/crosslinking c) short chain triols contribute more to hard segment and cracking of film is observed d) poor hydrolytic stability.

OBJECTS OF THE INVENTION

Therefore, the object of the present invention is to provide a process for the preparation of stable aqueous polyurethane dispersions which are stable over a wide range of temperature and under high shear force.

Another object of the present invention is to obtain coating with good water and chemical resistance particularly when crosslinked with aminoplast resins.

Yet another object of the present invention is to provide a coating with superior flexibility.

DETAILED DESCRIPTION OF THE INVENTION

Accordingly, the present invention provides a process for the preparation of aqueous polyurethane dispersions which comprises of preparing an isocyanate terminated carboxyl group containing prepolymer, by preparing a solution of a polyol in an organic solvent, adding an ionizable group containing compound to this solution, heating this mixture to a temperature ranging between 40° C. and 120° C., adding an isocyanate in this reaction mixture, either in the presence or absence of a catalyst depending upon the isocyanate, and stirring the mixture for a period ranging between 1 and 16 hours, neutralizing this mixture with a base, cooling the mixture to ambient temperature and dispersing the mixture in water to obtain the product.

In an embodiment of the present invention, the polyol used may be a linear polyether and/or polyester diol which is normally used in polyurethane synthesis and, more particularly, branched polyester polyol of molecular weight in the range of 300 to 5000 more preferably in the range of 300 to 3000.

In another embodiment the polyether/polyester diols may contain three or more hydroxyl groups, and have a hydroxyl number between 50 and 100 mg KOH/gm and acid number preferably less than 2 mg. KOH/gm.

In another embodiment the organic solvent used for preparing the solution of the polyol, may be selected from substantially non-reactive organic solvents to the isocyanate polyaddition reaction containing carbon and hydrogen with or without other elements such as oxygen or nitrogen exemplified by dimethyl formamide, esters, ethers, ketoesters, ketones (e.g. acetone and butan-2-one), glycol ether esters, chlorinated hydrocarbons, aliphatic and alicyclic hydrocarbons, pyrrolidones (e.g. N-methyl-2-pyrrolidone) hydrogenated furans and aromatic hydrocarbons or mixtures thereof.

In yet another embodiment the ionizable group used may be an organic compound, containing, at least, one active hydrogen and, at least one group, capable of salt formation and may be selected from compounds having the general formula,

$(HO)_m R(COOH)_n$.

Wherein R represents a straight or branched hydrocarbon containing 1 to 12 carbon atoms and m, and n represent values between 1 and 3, more preferably the acids of the aforementioned formula wherein m=2, n=1 and R=—CH$_3$, exemplified by œ,œ'-dimethylol propionic acid, and other acids including hydroxy, amino hydroxy, amines and mercapto carboxylic acids, sulphonic acids, hydroxy and amino sulphonic acids such as dimethylol propionic acid, oxaluric acid, anilido acetic acid, dihydroxy tartaric acid, 2,6-dihydroxy benzoic acid, glycolic acid, thio glycolic acid, glycine, alpha alanine, 6-amino caproic acid, 2-hydroxy ethane sulphonic acid, 4,6-diamino benzene, 1,3-disulphonic acid, and 2-amino diphenylamino sulphonic acid more preferably the carboxylate groups.

In still another embodiment the concentration of the ionizable group may be in the range of 2 to 100 milliequivalents, preferably 2–80 milliequivalents, more preferably about 10–60 milliequivalents and most preferably about 15–50 milliequivalent.

In another embodiment the organic diisocyanate may be (cyclo) aliphatic, and/or aromatic type. (Cyclo) aliphatic isocyanates are the most preferred one because of better UV/weathering properties of the derived film, exemplified by 2,2,4-trimethyl hexamethylene diisocyanate, 1,4-tetramethylene diisocyanate, 1,6-hexamethylene diisocyanate(HDI), isophorone diisocyanate(IPDI), 4,4'-methylene-bis-(cyclohexane diisocyanate), meta or para-tetramethyl xylene diisocyanate and α, α'-xylylene diisocyanate. Examples of suitable aromatic diisocyanates are toluene diisocyanate, 1,4 phenylene diisocyanate, 4,4'-diphenyl methane diisocyanate, and meta or para-tetramethyl xylene diisocyanate. In addition to organic diisocyanates, polyfunctional isocyanates can be used in place of, or in combination with diisocyanates. Suitable higher polyisocyanates include 2,4,6-triisocyanate toluene, 4,4',4"-triisocyanate triphenyl methane, 1,2,4-benzene triisocyanate, biurets of diisocyanates, trimer of HDI, IPDI and TMP (3 D Trimethylol propane) adducts of TDI (Toluene diisocyanate), IPDI, HDI, MDI (Methylene diisocyanate), TMXDI (3 D Tetramethyl xylene diisocyanate) and the like.

In another embodiment of the present invention, catalyst may be optionally used to enhance the isocyanate—hydroxyl reaction. Suitable catalysts include triethylene diamine, morpholine, N-ethylmorpholine, piperazine, triethanolamine, triethylamine, dibutyltindilaurate, stannous octoate, dioctyl tin diacetate, lead octoate, stannous tallate and dibutyltindioxide.

In still another embodiment of the present invention, the base used for neutralization may be selected from primary, secondary, tertiary amines and/or alkali metal hydroxides such as substituted tertiary amines exemplified by, trimethylamine, triethylamine, triisopropylamine, tributylamine, N,N-dimethylcyclohexylamine, N,N-dimethylstearylamine, N,N-dimethylaniline, N-methylmorpholine, N-ethylomorpholine, N-methylipiperazine, N-methyl-2-pyrrollidone, N-methylpiperidine, N,N-dimethylamino ethanol, N,N-diethylethanolamine, triethanolamine, N-methyldiethanol amine, dimethylamino propanol, 2-ethoxyethyldimethylamine, N-hydroxyethylpiperazine, 2-(2-dimethyl amino ethoxy)ethanol and 5-diethyl amino-2-pentanone, or alkali metal hydroxides like NaOH, KOH, LiOH and the like.

In a feature of the present invention the branched polyester polyols are prepared by condensation polymerisation reaction between a hydroxyl and/or carboxyl terminated linear polyester and a polyfunctional polyol of low molecular weight. The linear polyesters are normally prepared from dibasic acids and a diol. Dibasic acids include, adipic acid, succinic acid, sebasic acid, azelaic acid, isophthalic acid, 1,4-cyclohexane dicarboxylic acid, phthalic acid, terephthalic acid, tetrahydro phthalic acid, phthalic anhydride and tetrahydro phthalic anhydride. Suitable diols such as ethylene glycol, 1,2-propyleneglycol, 1,3-propyleneglycol, diethylene glycol, 1,4-butane diol 1,3-butane diol, 1,6-hexane diol 1,8-octane diol, neopentyl glycol, 2-methyl-1,3-propane diol and 1,4cyclohexane dimethanol. The low molecular weight polyfunctional polyol include trimethylol propane, ditrimethylol propane, 1,2,6-hexane triol (its isomers), pentaerythrytol, di and tripentaerythrytol, sorbitol and glycerine. Polyesterification reactions are self catalysed by carboxyl group of the acid components, but since the concentration of these groups decreases with increasing conversion, other catalysts are often employed to maintain the rate of reaction. Catalysts include protonic acids, lewis acids, titanium alkoxides, and dialkyl tin (IV)oxides. Strongly acidic catalysts tend to promote discoloration and hydrolysis of the product unless they are neutralized and removed from the polyesters. It is preferred to use the approach via condensation with excess diol followed by base catalysed alcoholysis to obtain high molecular weight.

In another feature of the present invention in combination with the branched polyester polyol the following polyols can optionally be used.

1. Linear polyester polyols which are derived from the reaction of dicarboxylic acids and diols.
2. Linear or branched polyether polyols preferably linear like polyethylene glycol, polypropylene glycol and the like and more preferably polypropylene glycol of molecular weight 300–3000
3. Polylactones e.g, polymers derived from the reaction of ε-caprolactone with dihydric alcohols.
4. Polycarbonates normally derived by the reaction of diols and diaryl carbonates or phosgene.
5. Polythioethers, polythioether esters, polythio mixed ethers.
6. Polyacetals which are formed from the reaction of diols and formaldehyde.

In another feature of the present invention the solvent amount should be sufficient to provide the prepolymer having a sufficiently low viscosity to enhance the formation of urethane dispersion. Low boiling solvents like acetone or, methyl ethyl ketone are very often mixed with high boiling solvents, during the preparation of urethane prepolymer. Advantageously, the low boiling solvents can be removed from the dispersion either by vacuum distillation or by thin film evaporation. The high boiling solvents on the other hand are normally retained in the dispersion and enhance the coalescence of the dispersed particles during the process of film formation.

In yet another feature of the present invention normally primary, secondary and hydroxyl group containing amines are not preferred because they react with the free isocyanates of the prepolymer and thereby act as a chain terminator or chain extender rather than play the role of neutralizing agent.

In still another feature of the present invention the isocyanate terminated carboxyl group containing prepolymer is prepared by reacting branched polyester polyol, an ionic group bearing organic compound and an organic diisocyanate. The above components can be reacted simultaneously or sequentially to produce random or block copolymers respectively. Normally the ratio of isocyanate group to active hydrogen containing group is maintained between 1.05 and 3, preferably about 1.2 to 2 and most preferably about 1.3 to 1.6 on an equivalent basis. The temperature of the reaction between isocyanate and the isocyanate reactive groups is maintained normally below 150° C. and more preferably about 40–120° C., and most preferably about 60–100° C. It is desirable to use an isocyanate non reactive solvent during the prepolymer production to ensure better temperature control.

The neutralisation step may be carried out preferably before the formation of the prepolymer i.e treating the component containing ionizable group(s) and more preferably during dispersion stage i.e., addition of part or all of the neutraliser into water and most preferably after prepolymer formation but prior to the dispersion step. During neutralisation the temperature is maintained between 20 and 150° C., but normally conducted below 100° C. and more preferably between 30 and 80° C. and most preferably between 50 and 70° C., with good agitation. The dispersion step can be carried out by any one of the following ways.

a) Water is added to the neutralised prepolymer with good stirring.
b) Unneutralised prepolymer is added to water containing the neutralising agent.
c) Neutralised prepolymer is added to water with good agitation.

When dispersion is carried out according to step (a), initially viscosity pickup is observed. This is because, organic phase is continuous initially and as water addition is continued a phase change will occur, and viscosity of the dispersion is reduced. When dispersion is carried out in accordance with step (b), chain extension of isocyanate group takes place before neutralisation. This eventually leads to higher particle size of the final dispersion. Also, the dispersion step is obviated. This problem can be solved by the incorporation of more hydrophilic moieties and/or neutralising agent to water. Coating obtained from these dispersion becomes more sensitive to water due to more hydrophilic centers. In the present invention dispersion is carried out according to step (c) i.e., prepolymer is added to water. The temperature of the prepolymer is maintained below 120° C., more preferably between 30 and 100° C. and most preferably between 50–80° C. The water temperature is normally maintained below 80° C., more preferably at 50° C. and most preferably between 25 and 40° C. Using this dispersion technique, it is possible to control viscosity pickup and higher particle size buildup of the dispersion obtained from step (a) and (b) respectively.

The urethane dispersion obtained by this invention is branched and/or crosslinked (particularly via allophanate linkages). These dispersions dry at ambient temperature and find applications in coating industry preferably as an architectural paint, and leather coatings. The air dried film exhibits good water and chemical resistance. However, to meet the stringent specifications defined by the Original Equipment Manufacturers the polyurethane dispersions obtained by the present invention are crosslinked with aminoplast resins and cured at suitable temperature resulting in films with excellent water, chemical, abrasion, and weather resistance. Amino plast resins used in the present invention include, melamine formaldehyde (MF), urea formaldehyde (UF) and other formaldehyde based resin system. Crosslinking takes place at elevated temperature normally above 80° C., more preferably between 100 and 160° C. and most preferably between 120 and 140° C. The amount of aminoplast resin normally varies from 3 to 20 parts per hundred of resin (phr), more preferably between 5 and 15 phr, and most preferably between 7 and 12 phr.

The single component poyurethane dispersions thus obtained are stable over a wide range of temperatures, and possess good shear resistance. The particle size is generally below $1.0\mu$ preferably between $.001\mu$ and $0.5\mu$. The average particle size is less than about $0.5\mu$ and preferably between 0.01 and $0.2\mu$. A very small particle size thus obtained by the present invention enhances the stability of the dispersion and also the surface gloss of dried film.

The process for the present invention is described herein below with examples which are illustrative only and should not be construed to limit the scope of the present invention in any manner.

EXAMPLE 1

This example illustrates the preparation of aqueous polyurethane from a branched polyester polyol derived from trimethylol propane. These polyesters were prepared by mixing 576.2 g adipic acid, 410.8 g neopentyl glycol and 36.0 g xylene in a four neck two liter flask equipped with a thermometer, a glass tube for nitrogen sparging, a Dean Stark trap attached with a double walled condenser and a stirrer with three inch half moon blade. The contents were heated upto 100° C. and added 0.6 g of dibutyl tin oxide was added. The temperature was then increased slowly (10° C./hr) upto 170° C. The reaction was then maintained at that temperature till the removal of 116 mL water. The acid value was around 75±5 milligram KOH/gram of sample. Then 176.4 g of trimethylol propane was added and heating was continued at 220° C.±20° C. during which time an additional 28 mL of water was collected. The acid value was ≦2 milligram KOH per g resin. The polyester thus obtained had a hydroxyl value 207 milligram KOH per g resin and an acid value 1.35 milligram KOH per g resin. To 180.0 g of the above polyester resin, 20.1 g dimethylol propionic acid and 150 g N-methyl-2-pyrollidone were charged in a four neck two liter flask equipped with a thermometer, a glass tube for nitrogen sparging, a condenser and a stirrer with three inch half moon blade. The contents were heated upto 70° C. The reaction mixture was kept at that temperature for one hour 149.9 g isophorone diisocyanate was added dropwise using an addition funnel for about 30 min. The temperature was maintained at 70° C. during this exothermic reaction. The reaction was continued till the isocyanate value reached 3.4% (theoretical NCO=4.5%), as determined by dibutyl amine titration. Triethyl amine, 17.1 g was then added and stirred well for 10–15 min. 250 g of prepolymer thus obtained was then added to 235 g of water with stirring to give an aqueous polyurethane dispersion with % solid=36.9, viscosity=93 cps and pH=9.03.

EXAMPLE 2

This example concerns the preparation of aqueous polyurethane from a branched polyester polyol, derived from 1,2,6-hexanetriol. These polyesters were prepared by mixing 576.2 g adipic acid, 410.8 g neopentyl glycol and 36.0 g xylene in a four neck two liter flask equipped with a thermometer, a glass tube for nitrogen sparging, a Dean Stark trap attached with a double walled condenser and a stirrer with three inch half moon blade. The contents were heated upto 100° C. and added 0.6 g of dibutyl tin oxide was added. The temperature was then increased slowly (10° C./hr) upto 170° C. The reaction was then maintained at that temperature till the removal of 116 mL water. The acid value was around 75±5 milligram KOH/gram of sample. Then 176.4 g of 1,2,6-hexanetriol was added and heating was continued at 220° C.±20° C. during which time an additional 28 mL of water was collected. The acid value was ≦2 milligram KOH per g resin. The polyester thus obtained had a hydroxyl value 207 milligram KOH per g resin and an acid value 1.35 milligram KOH per g resin.

To 180.0 g of the above polyester resin, 20.1 g dimethylol propionic acid and 150 g N-methyl-2-pyrollidone were charged in a four neck two liter flask equipped with a thermometer, a glass tube for nitrogen sparging, a condenser and a stirrer with three inch half moon blade. The contents were heated upto 70° C. The reaction mixture was kept at that temperature for one hour. 149.9 g isophorone diisocyanate was added dropwise using an addition funnel for about 30 min. The temperature was maintained at 70° C. during this exothermic reaction. The reaction was continued till the isocyanate value reached 3.4% (theoretical NCO=4.5%), as determined by dibutyl amine titration Triethyl amine, 17.1 g was then added and stirred well for 10–15 min. 250 g of prepolymer thus obtained was then added to 235 g of water with stirring to give an aqueous polyurethane dispersion with % solid=35.82, viscosity=524 cps and pH=8.87.

COMPARATIVE EXAMPLE 1

A linear polyester polyol is prepared by charging 596.5 g adipic acid, 566.9 g neopentyl glycol and 36.0 g xylene in a four neck two liter flask equipped with a thermometer, a glass tube for nitrogen sparging, a Dean Stark trap attached with a double walled condenser and a stirrer with three inch half moon blade. The contents were heated upto 100° C. and 0.6 g of dibutyltinoxide was added. The temperature was then increased slowly up to 220° C. The temperature was maintained at 220° C.±2° C., till the acid value reaches ≦2 milligram KOH per g resin. The polyester thus obtained had hydroxyl value of 145 milligram KOH per g resin and an acid value of 2.06 milligram KOH per g resin. To 217.5 g of the above polyester resin, 19.5 g dimethylol propionic acid and 150 g N-methyl-2-pyrollidone were charged in a four neck 2 liter flask equipped with a thermometer, a glass tube for nitrogen sparging, a condenser and a stirrer with three inch half moon blade. The contents were heated upto 70° C. The reaction mixture was held at this temperature for one hour. 113.1 g isophorone diisocyanate was added drop wise using an addition funnel for about 30 min. The temperature was maintained at 70° C. during this exothermic reaction. The reaction was continued till the isocyanate value reaches 1.21% (thoretical NCO=4.5%), which was determined by dibutyl amine titration. 15.6 g triethyl amine was then added and stirred well for 10–15 min. 250 g of prepolymer thus obtained was then added to 235 g of water with stirring to give an aqueous polyurethane dispersion with % solid=38.8, viscosity=46.4 and pH=7.4.

COMPARATIVE EXAMPLE 2

This example illustrates the addition of short chain triol (trimethylol propane) to a linear polyester and processing urethane dispersion thereof. The linear polyester polyol is prepared by charging 106.8 g adipic acid, 101.6 g neopentyl glycol and 6.5 g xylene in a four neck two liter flask equipped with a thermometer, a glass tube for nitrogen sparging, a Dean Stark trap attached with a double walled condenser and a stirrer with three inch half moon blade. The contents were heated upto 100° C. and 0.12 g of dibutyltinoxide was added. The temperature was then increased slowly upto 220° C. The temperature was maintained at 220° C.±2° C., till the acid value reaches ≦2 milligram KOH per g resin. The polyester thus obtained had hydroxyl value of 145 milligram KOH per g resin and an acid value of 2.06 milligram KOH per g resin. To the 195.5 g polyester polyol thus obtained, charged 2.9 g trimethylol propane, 19.8 g dimethylol propionic acid and 150.0 g N-methyl-2-pyrollidone in a four neck two liter flask equipped with a thermometer, a glass tube for nitrogen sparging, a condenser and a stirrer with three inch half moon blade. The contents were heated upto 70° C. The reaction mixture was kept at that temperature for one hour. 131.8 g isophorone diisocyanate was added drop wise using an addition funnel for about 30 min. The temperature was maintained at 70° C. during this exothermic reaction. The reaction was continued till the isocyanate value reached 4.00% (theoretical NCO=3.96%), which was determined by dibutyl amine titration. 15.0 g triethyl amine was then added and stirred well for 10–15 min. 200 g of prepolymer thus obtained was then added to 235 g of water with stirring giving a polyurethane dispersion with % solid=35.63, viscosity=27.6 cps and pH=8.83.

COMPARATIVE EXAMPLE 3

This example differs from comparative example 2 in such a way that here, 1,2,6-hexane triol was used in place of trimethylol propane. A linear polyester polyol is prepared by charging 106.8 g adipic acid, 101.6 g neopentyl glycol and 6.5 g xylene in a four neck two liter flask equipped with a thermometer, a glass tube for nitrogen sparging, a Dean Stark trap attached with a double walled condenser and a stirrer with three inch half moon blade. The contents were heated upto 100° C. and 0.12 g of dibutyltinoxide was added. The temperature was then increased slowly upto 220° C. The temperature was maintained at 220° C.±2° C., till the acid value reaches ≦2 milligram KOH per g resin. The polyester thus obtained had hydroxyl value of 145 milligram KOH per g resin and an acid value of 2.06 milligram KOH per g resin. To the 195.5g polyester polyol thus obtained, charged 2.9 g 1,2,6-hexane triol, 19.8 g dimethylol propionic acid and 150.0 g N-methyl-2-pyrollidone in a four neck two liter flask equipped with a thermometer, a glass tube for nitrogen sparging, a condenser and a stirrer with three inch half moon blade. The contents were heated upto 70° C. The reaction mixture was kept at that temperature for one hour. 131.8 g isophorone diisocyanate was added drop wise using an addition funnel for about 30 min. The temperature was maintained at 70° C. during this exothermic reaction. The reaction was continued till the isocyanate value reached 3.8% (theoretical NCO=3.96%), which was determined by dibutyl amine titration. 15.0 g triethyl amine was then added and stirred well for 10–15 min. 200 g of prepolymer thus obtained was then added to 235 g of water with stirring gives a polyurethane dispersion with % solid=36.23, viscosity=30.6 cps and pH=8.95.

The film properties of the aqueous polyurethane dispersions are shown in the following Table. In deriving the data the urethane dispersion was cast on to glass plate and dried at 140° C. for 20 minutes. Film properties were evaluated after 24 hours aging at room temperature.

| PROPERTIES | Example 1 | Example 2 | Comparitive Example 1 | Comparitive Example 2 | Comparitive Example 3 |
|---|---|---|---|---|---|
| | | | OBSERVATION | | |
| TRIOL USED | TMP based polyester | 1,2,6-hexane triol based polyester | NIL | TMP added externally | 1,2,6 hexane triol added externally |
| Water resistance | | | | | |
| a) room temperature (7 days) | not affected | not affected | hazy after 4 hr. | hazy after 24 hr. | hazy after 24 hr. |
| b) at 55° C. (240 hr) | slight blisters after 4 days | not affected | fails | fails | fails |
| c) at 80° C. (2 hr) | slight blisters hazy after 1 hr | not affected | fails | fails | fails |
| MEK (double rubs) | 75 | 75 | 25 | 50 | 50 |
| Tensile strength (MPa) | 6.3 | 16.7 | 4.06 | 7.17 | 5.0 |
| Elongation (%) | 92.13 | 126.07 | 25.86 | 166.2 | 151.4 |
| Scratch hardness (gram) | 2000 | >2200 | 1800 | 1800 | 1800 |

The main advantage of the polyurethane dispersion obtained by the present invention is that they are suitable for coatings and non coating applications such as adhesives and sealants. They can be applied to a wide range of substrates such as plastics, metal, leather, paper, textiles, wood, concrete, porcelain, glass fibers for antistatic and crease resistance finishing, as a binder for printing inks. They are extremely suitable for chip resistance and weather resistance coating in automotive application, for furniture and air craft. Additionally, they are valuable cobinders for acrylic emulsion to improve flexibility scuff resistance, water and chemical resistance. They can be applied on surface by means of brush, roller, spray and the like. Polyurethane dispersions obtained from the present invention showed better hardness coupled with flexibility and good hydrolytic stability. Urethane dispersion obtained by the present invention is largely unaffected by electrolytes and may be pigmented with electrolyte active dyes or pigments. Urethane dispersion mixed with aminoplast resins are stable over a wide range of temperature, shelf stable, storable and transportable. The dispersions are compatible with other dispersions for e.g. PVA, polyethylene, polystyrene, polybutadiene, PVC, polyacrylate and the like. The dispersions can easily be compounded with fillers, pigments (organic and inorganic), dyes, plasticisers and other additives such as silicones and thickeners.

We claim:

1. A process for the preparation of an aqueous polyurethane dispersion which comprises preparing an isocyanate terminated carboxyl group containing prepolymer by preparing a solution of a polyol in an organic solvent, adding a compound containing an ionizable group to the solution, wherein the ionizable group is an organic compound containing at least one active hydrogen, at least one group capable of salt formation and is selected from compounds having the formula, (HO)$_m$R(COOH)$_n$ wherein R represents a straight or branched hydrocarbon containing 1 to 12 carbon atoms, and m and n represent values between 1 and 3, heating the mixture to a temperature ranging between 40° C. and 120° C., adding an isocyanate to the mixture, and stirring the mixture for a period ranging between 1 and 16 hours, neutralizing the mixture with a base, cooling the mixture to ambient temperature and dispersing the mixture in water to obtain the dispersion.

2. The process as claimed in claim 1 wherein, the polyol is a linear polyether, a polyester diol or a mixture thereof.

3. The process as claimed in claim 2 wherein, the polyether diol contains three or more hydroxyl groups, has a hydroxyl number between 50 and 100 mg. KOH/gm and an acid number less than 2 mg. KOH/gm.

4. The process as claimed in claim 1 wherein, the organic solvent is selected from substantially non reactive organic solvents to the isocyanate polyaddition reaction and the solvent contains carbon and hydrogen and optionally oxygen or nitrogen.

5. The process as claimed in claim 1 wherein, the concentration of the ionizable group is in the range of 2 to 100 milliequivalents.

6. The process as claimed in claim 1 wherein, the isocyanate is an organic diisocyanate and is selected from the group consisting of (cyclo) aliphatic, aromatic isocyanate, polyfunctional isocyanates or a mixture thereof.

7. The process as claimed in claim 1 further comprising a catalyst to enhance the isocyanate—hydroxyl reaction wherein, the catalyst is selected from the group consisting of triethylene diamine, morpholine, N-ethylmorpholine, piperazine, triethanolamine, triethylamine, dibutyltindilaurate, stannous octoate, dioctyl tin diacetate, lead octoate, stannous tallate and dibutyltindioxide.

8. The process as claimed in claim 1 wherein, the base used for neutralization is selected from primary, secondary, tertiary amines, alkali metal hydroxides or a mixture thereof.

9. The process according to claim 2 wherein, the polyols are branched polyester polyols having molecular weights in the range of 300 to 5000.

10. The process according to claim 2 wherein, the polyols are branched polyester polyols having molecular weights in the range of 300 to 3000.

11. The process according to claim 4 wherein, the organic solvent is a dimethyl formamide, an ester, an ether, a ketoester, a ketone, a glycol ether ester, a chlorinated hydrocarbon, an aliphatic or alicyclic hydrocarbon, pyrrolidone, a hydrogenated furan or aromatic hydocarbons or mixtures thereof.

12. The process according to claim 1 wherein, the ionizable group is

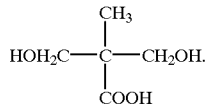

13. The process according to claim 1 wherein, the ionizable group is selected from , '-dimethylol propionic acid, hydroxy acid, amino hydroxy acid, amino carboxylic acids, sulphonic acids, or amino sulphonic acids.

14. The process according to claim 1 wherein the ionizable group is selected from the group consisting of dimethylol propionic acid, oxaluric acid, anilido acetic acid, dihydroxy tartaric acid, 2,6-dihydroxy benzoic acid, glycolic acid, thioglycolic acid, glycine, alpha alanine, 6-amino caproic acid, 2-hydroxy ethane sulphonic acid, 4,6-diamino benzene, 1,3-disulphonic acid and 2-amino diphenylamino sulphonic acid.

15. The process of claim 5 wherein the concentration of the ionizable group is in the range of 2–80 milliequivalents.

16. The process of claim 5 wherein the concentration of the ionizable group is in the range of 10–60 milliequivalents.

17. The process of claim 5 wherein the concentration of the ionizable group is in the range of 15–50 milliequivalents.

18. The process as claimed in claim 6 wherein, the isocyanate is selected from the group consisting of 2,2,4-trimethyl hexamethylene diisocyanate, 1,4-tetramethylene diisocyanate, 1,6-hexamethylene diisocyanate (HDI), isophorone diisocyanate (IPDI), 4,4'-methylene-bis-(cyclohexane diisocyanate), meta or para-tetramethyl xylene diisocyante, , '-xylylene diisocyanate, toluene diisocyanate, 1,4 phenylene diisocyanate, 4,4'-diphenyl methane diisocyanate, meta or para-tetramethyl xylene diisocyanate, 2,4,6-triisocyanate toluene, 4,4',4"-triisocyanate triphenyl methane, 1,2,4-benzene tiisocyanate, biurets of diisocyanate, trimer of HDI, IDPI and TMP adducts of TDI, IPDI, HDI, MDI or TMXDI.

19. The process as claimed in claim 8 wherein, the base is selected from the group consisting of trimethylamine, triethylamine, triisopropylamine, tributylamine N,N-dimethyl-cyclohexylamine, N,N-dimethylstearylamine, N,N-dimethylaniline, N-methylmorpholine, N-ethylmorpholine, N-methylpiperazine, N-methyl-2-pyrrolidone, N-methyliperidine, N,N-dimethylamino ethanol, N,N-diethylethanolamine, triethanolamine, N-methyldiethanol amine, dimethylamino propanol, 2-ethoxyethyldimethylamine, N-hydroxyethylpiperazine, 2-(2-dimethyl amino ethoxy)ethanol, 5-diethyl mino-2-pentanone, NaOH, KOH and LiOH.

20. The process as claimed in claim 4 wherein the organic solvent is acetone, butan-2-one or N-methyl-2-pyrrolidone.

* * * * *